United States Patent

[11] 3,570,742

[72] Inventor Walter E. Graham
 1140 Karen Raod, Montgomery, Ala. 36109
[21] Appl. No. 796,022
[22] Filed Feb. 3, 1969
[45] Patented Mar. 16, 1971

[54] CARTRIDGE-LOADING HEATED SOLDERING ELEMENT CONSTRUCTION
 10 Claims, 5 Drawing Figs.
[52] U.S. Cl. .................................................. 228/53, 228/55, 228/52
[51] Int. Cl. .................................................. B23k 3/04
[50] Field of Search .......................................... 228/52, 53, 55; 219/229; 222/146; 206/46

[56] References Cited
UNITED STATES PATENTS

| | | | | |
|---|---|---|---|---|
| 2,300,716 | 11/1942 | Vawrvk | | 228/53 |
| 2,380,138 | 7/1945 | Abramson | | 228/53 |
| 2,780,712 | 2/1957 | Thomas | | 228/53 |
| 2,824,201 | 2/1958 | McDaniel | | 228/53 |
| 3,172,383 | 3/1965 | Emanus | | 228/53 |

Primary Examiner—John F. Campbell
Assistant Examiner—D. M. Heist
Attorney—Mason, Fenwick & Lawrence ABSTRACT: An electrically heated soldering element with a removable cartridge of solder received within a cavity in the element with a spherical valve mounted in the tip of the element and communicating with a solder-dispensing tubular extension on the cartridge so that inward movement of the valve sphere will open the valve to allow dispensing of melted solder from the cartridge.

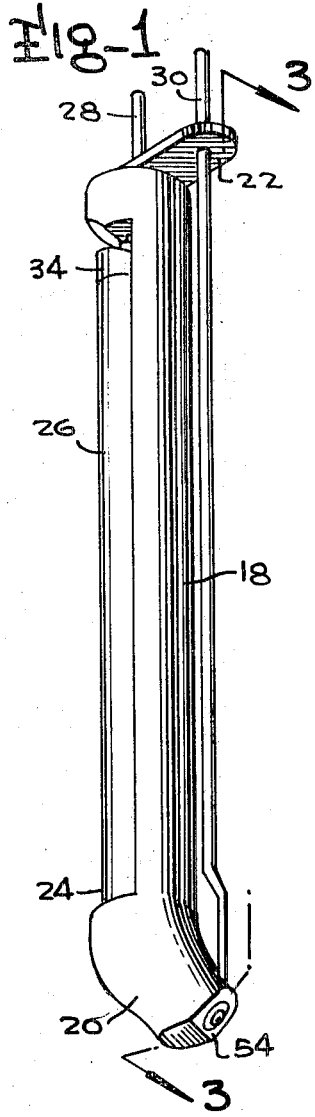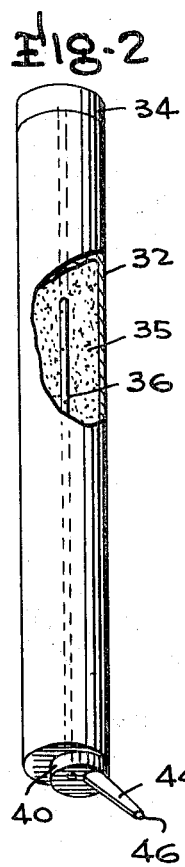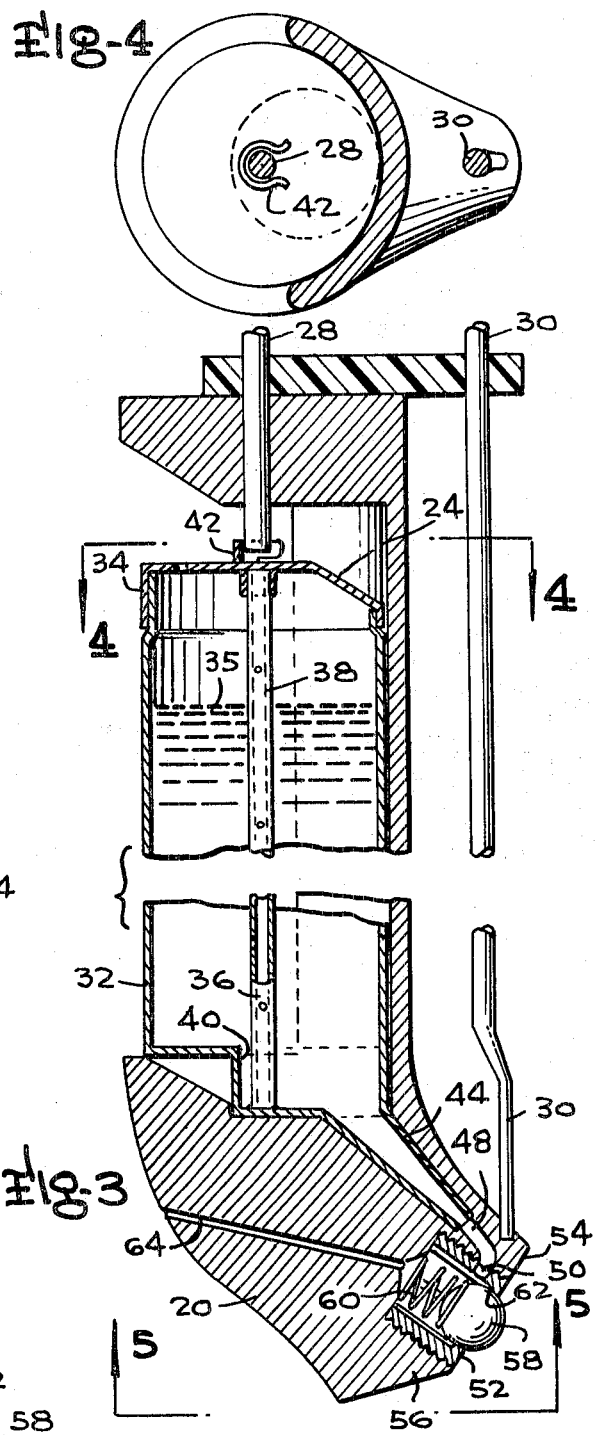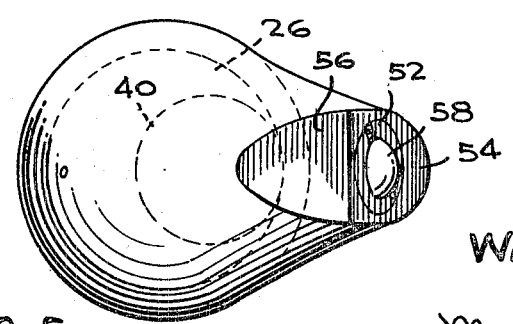
WALTER E. GRAHAM
INVENTOR
BY Mason, Fenwick & Lawrence
ATTORNEYS 3,570,742

CARTRIDGE-LOADING HEATED SOLDERING ELEMENT CONSTRUCTION

BACKGROUND OF THE INVENTION

This invention relates to the field of solder equipment and to soldering guns in particular and is specifically directed to an electric soldering gun having means for dispensing melted solder automatically.

The use of a soldering gun normally requires that the gun be held in one hand and the solder manually applied to the tip of the gun or the work being soldered with the other hand. While this method of operation is generally satisfactory when the parts being soldered are held in fixed relationship with respect to each other, it often occurs that the parts are loose with respect to each other and some means must be found for fixedly positioning the parts during the soldering application. Consequently, in situations of this type many technicians will hold the solder between their teeth in order to employ one hand for holding the parts in such a fixed position with respect to the other. Needless to say, this process is an awkward one and often results in unsatisfactory work.

Awareness of the aforediscussed problems has resulted in numerous attempts to provide an adequate solution to the problem by the provision of means for dispensing solder from or adjacent the soldering gun or iron tip. For example, U.S. Pat. application Ser. No. 325,158, now U.S. Pat. No. 3,297,452, to Coffee illustrates an early attempt to solve the problems and discloses a soldering iron having a hollow tip within which melted solder is contained for outward flow through a small aperture or opening in the end of the tip. Devices of this sort have not proven to be satisfactory since there is no control over the flow of solder so that an excessive amount of solder can and does flow from the opening.

Other prior known devices recognized the problems of the simple devices of the type shown in the Coffee patent and attempted to provide a solution through the provision of manually operable valve means for varying the flow of melted solder from the interior of the tip. Examples of devices of this sort are found in U.S. Pat. No. 1,233,614 to Self, U.S. Pat. No. 1,574,361 to Brown and U.S. Pat. No. 2,135,764 to Oleson. Although the devices of the last-mentioned patents employ manually operable valve means for controlling the amount of melted solder dispensed from the iron tip, such devices of the aforementioned type have not proven to be satisfactory in that they require extensive manual manipulation of the valve actuator for opening and closing the valve means associated with the soldering gun tip and consequently do not provide any substantial advantage over the simple nondispensing-type soldering iron or gun.

Another problem with the prior known soldering-iron construction of the type employing an internal cavity for heating the solder is that it is difficult to remove all the solder from the internal cavity within the iron tip. While this defect would not be of great importance to many operations, the purity and composition of the solder is of extreme importance in many environments such as electronic circuits and the like.

SUMMARY OF THE INVENTION

Therefore, it is the primary object of this invention to provide a new and improved soldering gun construction.

A still further object of this invention is the provision of a new and improved soldering gun construction having means for automatically dispensing solder if such is needed.

Yet another object of this invention is the provision of a new and improved soldering gun construction in which the solder is supplied from removable containers or cartridges which can be easily changed for changing the nature of the solder being dispensed.

Obtainment of the objects of this invention is enabled through the provision of a soldering gun tip provided with a recess into which a solder-containing cartridge is easily inserted. The cartridge has a dispensing tube extending from one end and communicating with a valve chamber from adjacent and within the end of the soldering iron tip. The valve chamber includes a small check valve incorporating a spherical valve member biased outwardly so as to protrude from the soldering iron's tip. When the spherical check valve extends outwardly in its protruded position, the valve is closed so that no melted solder from the cartridge can flow from the tip. However, movement of the spherical member against a workpiece moves the spherical member inwardly to allow solder to flow from the tip. Consequently, when the tip is removed from the work, the flow of solder is automatically terminated with no wastage of solder. Other aspects of the invention include the provision of a working face adjacent the solder-dispensing face for enabling the heating of workpieces without dispensing of solder upon such occasions as when such is desired or necessary.

DESCRIPTION OF THE DRAWINGS

FIG. 1 is a perspective view of the preferred embodiment of this invention;

FIG. 2 is a perspective view of the solder-containing cartridge forming a portion of the preferred embodiment;

FIG. 3 is a sectional view taken along lines 3-3 of FIG. 1;

FIG. 4 is a sectional view taken along lines 4-4 of FIG. 3; and

FIG. 5 is an end view of the soldering gun tip as viewed in the direction of lines 5-5 of FIG. 3.

DESCRIPTION OF THE PREFERRED EMBODIMENT

The preferred embodiment of this invention is directed to an electric soldering gun having a work heating element generally designated 18 which is provided with an offset tip 20 on its outermost end and is connected to a baseplate 22 on its innermost end. An elongated generally cylindrical chamber 24 is formed within the element 18 for receiving a generally cylindrical solder-containing cartridge 26 which is removably inserted therein.

First and second electrodes 28 and 30 respectively extend through the baseplate 22 for providing electrical current for heating the element 18 in a conventional manner. Second electrode 30 is connected adjacent the end of the tip 20 while the first electrode 28 merely extends only a short distance into the chamber 24 as best illustrated in FIG. 3 of the drawings. Electrodes 28 and 30 are connected to the conventional voltage source of a soldering gun handle (not shown) of any conventional type so as to cause heating of the element when current flows through the element and cartridge from the electrodes.

Cartridge 26 comprises a generally cylindrical shell 32 having a removable cap 34 on its rear end for enabling the filling of the cartridge with solder material 35. A hollow heat-conducting tube 36 extends along the axis of cartridge 26 and conducts heat from the heating element 18 to the interior of the cartridge for melting the solder 35. Additionally, it should be noted that hollow tube 36 of the preferred embodiment contains a plurality of apertures 38 which permit flux material on the interior of the tube to escape upon the melting of the cartridge interior contents. However, it should be understood that the use of flux within the interior of the tube 36 is not mandatory and can be eliminated if the use of such material is not desireable.

The forward end of cartridge 26 is provided with a cylindrical retainer lug 40 mounted eccentrically with respect to the cartridge's longitudinal axis and which serves the purpose of retaining element tip 20 in a manner to be discussed in greater detail hereinafter. Retention of the rearmost end of the cartridge 26 within the heating element 18 is enabled through a horseshoe shaped clamp 42 which clampingly engages the innermost end of the first electrode 28 as best illustrated in FIG. 3.

A tubular solder discharge extension 44 extends outwardly and downwardly from the forward end of the eccentric cylindrical retaining lug 40 and is of hollow construction for enabling the discharge of liquid solder from within the interior of cartridge 26. The tubular extension 44 has an open aperture 46 on its extreme end for enabling the discharge of the melted solder.

The tubular extension 44 is matingly received in a discharge conduit 48 formed in the tip 20 as illustrated in FIG. 3. The lower end of the conduit 48 communicates with an aperture 50 extending through the wall of a threaded cylindrical valve body cup member 52 which is threadably retained in a cylindrical cavity extending inwardly from a first planar face 54 on the tip 20. Face 54 serves as a solder-dispensing surface and a second or work face 56 is formed adjacent one edge of face 54 and is used for heating a joint or other work area when it is not desired to dispense melted solder upon same.

A valve member comprising a movable valve member in the form of a spherical ball 58 is mounted within the valve body cup 52 to be biased outwardly by a coil compression spring 60 against a valve seat 62. Dispensing of solder is prevented when the spherical ball 58 is biased against the seat 62 as shown in FIG. 3. However, spherical ball 58 is movable inwardly by engagement with a work area so as to enable the consequent dispensing of melted solder from the interior of the valve body cup 52 in a n obvious manner. Moreover, a vent line 64 is formed in the tip 20 for enabling a free and easy dispensing of the melted solder from the valve.

One very significant aspect of the instant invention involves the fact that the valve member comprising the valve body cup 62 and spherical ball 58 etc. is easily removable for replacement by other valve members of varying capacity. For example, in some soldering operations, it is necessary that only a small amount of liquid solder be dispensed. Applications of this type would require a valve construction having a small dispensing aperture. On the other hand, in other applications in which a greater quantity of solder would be desired, a valve of greater capacity would be required. The removability of the valve means also enables a thorough cleaning or replacement of such when changing solder compositions.

Cartridge 26 is inserted in the heating element 18 by initially positioning the tubular extensions 44 and the eccentric retaining lug 40 within the mating portions of element 18 within which they are to be received. The rearmost end of the cartridge is then moved downwardly and inwardly so as to engage the horseshoe clamp 42 over the end of the electrode 28 to provide a relatively fixed mounting of the cartridge in the heating element. The cartridge can be removed by pivoting the rear end outwardly from the heating element and removing same in reverse order from the manner in which it is inserted in the heating element.

Variations in the exact construction of the subject invention will occur to those skilled in the art and it should be understood that the subject invention is limited solely by the appended claims.

I claim:

1. A soldering means having a heating element with a heated tip portion comprising, a solder cartridge-receiving chamber in said heating element for receiving a cartridge container of solder, a cartridge container of solder in said chamber, a solder-dispensing tubular extension extending from said cartridge, a solder discharge conduit in said tip portion communicating with said solder-dispensing tubular extension for gravitationally dispensing solder from said tip when solder within said cartridge is melted with said discharge conduit including valve means comprising a spring-urged valve closure member movable to an open position for allowing discharge of melted solder and movable to a closed position for preventing discharge of melted solder wherein said spring-urged valve closure member is mounted in a removable valve body cup threadedly received within said tip and is biased outwardly from said tip and has a projecting portion projecting outwardly of said tip so that engagement of said projecting portion with an object to be soldered will move said closure member inwardly for opening said valve to allow melted solder to flow therefrom onto the object to be soldered.

2. The invention of claim 1 wherein said spring-urged closure member is a spherical ball mounted within said valve body cup.

3. The invention of claim 2 additionally including a vent extending through said tip and communicating with the interior of said valve body cup.

4. The invention of claim 3 wherein said tip portion includes a solder-dispensing face from which melted solder is dispensed from said valve body cup and a planar working face adjacent said dispensing face and oriented at an acute angle with respect to said dispensing face.

5. The invention of claim 4 wherein said spherical ball includes a portion which extends outwardly from the surface of said solder-dispensing face.

6. The invention of claim 5 wherein said solder-dispensing face is oriented at an angle with respect to the longitudinal axis of said heating element at an acute angle less than the angle at which said working face is oriented with respect to said heating element.

7. The invention of claim 1 wherein said tip portion includes a solder-dispensing face on which melted solder is dispensed and a planar working face adjacent said dispensing face and oriented at an acute angle with respect to said dispensing face.

8. The invention of claim 7 wherein said spring-urged closure member is a spherical ball mounted within said valve body cup.

9. The invention of claim 8 additionally including a vent extending through said tip and communicating with the interior of said valve body cup.

10. The invention of claim 9 wherein said spherical ball includes a portion which extends outwardly from the surface of said solder-dispensing face when said solder-dispensing face is not in engagement with a surface to be soldered.